Figure 5:
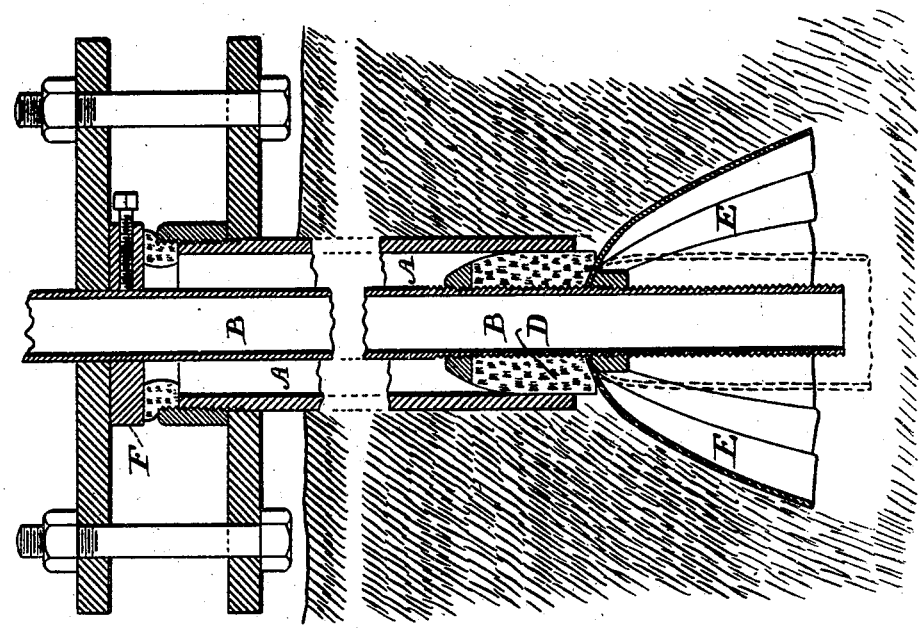

(No Model.) 4 Sheets—Sheet 1.
R. L. HARRIS.
FOUNDATION OR INCLOSURE FOR BUILDINGS.
No. 464,771. Patented Dec. 8, 1891.
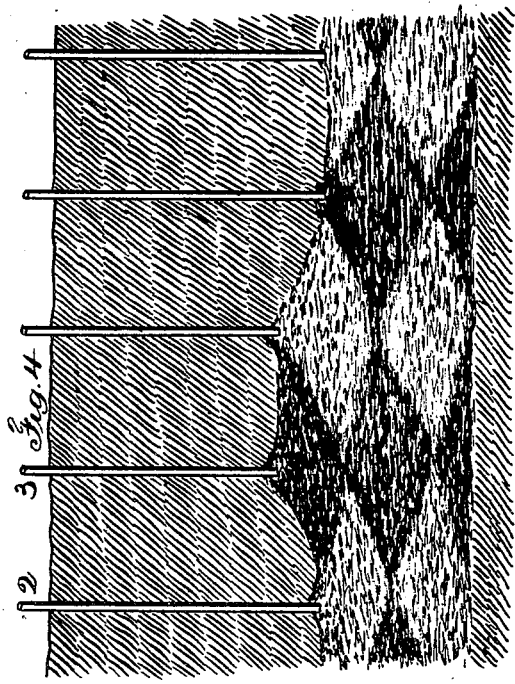
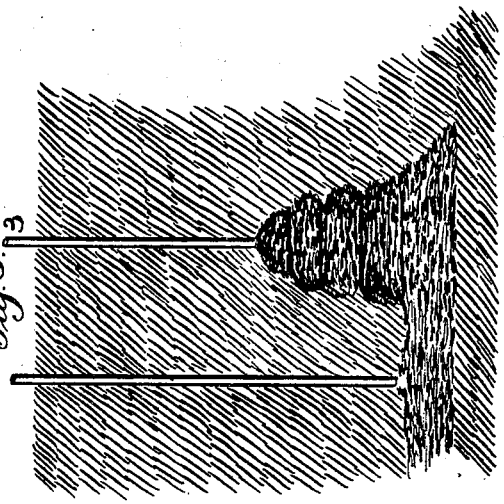
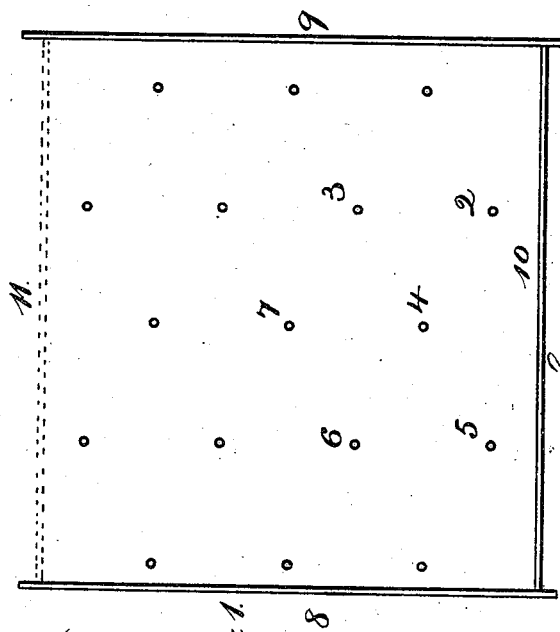
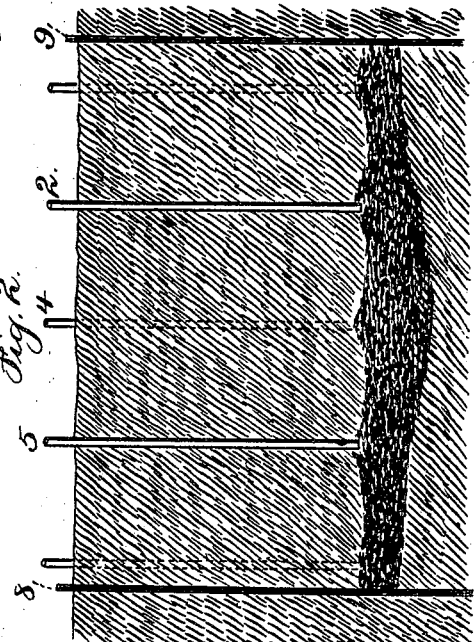
Witnesses
Chas. H. Squire
Harold Torr
Inventor
Robert L. Harris
per Lemuel W. Serrell
atty (No Model.) 4 Sheets—Sheet 2.

R. L. HARRIS.
FOUNDATION OR INCLOSURE FOR BUILDINGS.

No. 464,771. Patented Dec. 8, 1891.

Witnesses
Chas. H. Smyth
Harold Serrell

Inventor
Robert L. Harris,
per Lemuel W. Serrell
Atty (No Model.) 4 Sheets—Sheet 3.

R. L. HARRIS.
FOUNDATION OR INCLOSURE FOR BUILDINGS.

No. 464,771. Patented Dec. 8, 1891.

Witnesses
Chas. N. Smith
J. Staib

Inventor.
Robert L. Harris.
per Lemuel W. Serrell (No Model.) 4 Sheets—Sheet 4.
R. L. HARRIS.
FOUNDATION OR INCLOSURE FOR BUILDINGS.

No. 464,771. Patented Dec. 8, 1891.

UNITED STATES PATENT OFFICE.

ROBERT L. HARRIS, OF NEW YORK, N. Y.

FOUNDATION OR INCLOSURE FOR BUILDINGS.

SPECIFICATION forming part of Letters Patent No. 464,771, dated December 8, 1891.

Application filed May 25, 1891. Serial No. 393,966. (No model.)

*To all whom it may concern:*

Be it known that I, ROBERT L. HARRIS, a citizen of the United States, residing in the city and State of New York, have invented an Improvement in Foundations or Inclosures for Buildings and other Structures, of which the following is a specification.

In Letters Patent No. 435,142, granted to me August 26, 1890, I have described the manner in which cement can be introduced or forced between the loose materials under or forming part of foundations or structures.

My present invention is a modification of and improvement upon the same, especially for solidifying fine or easily-moving materials.

It is well known that quicksands are often very compact and apparently solid until slightly disturbed, when they become semi-fluid, and great difficulty has been experienced in constructing foundations in and building sewers through quicksands and in excavating at the proper depth for placing foundations, water-pipes, sewers, and structures of various kinds, because the water passing into the excavations loosens up the sand, and the sand is not only carried with the water, but the mass by agitation becomes loosened or so "alive" as to greatly impede, if not entirely obstruct and preclude, the construction of the work through such quicksand. Sand under many conditions makes an excellent foundation when confined. Quicksands when disturbed move freely in any direction, and thus become alive under water, even if apparently compact when quiescent.

My present invention is especially intended for use in quicksands; but it is also available in the preparatory work for the construction of foundations, tunnels, shafts, &c., in sand or other loose material, especially where such materials are beneath the water-level. When a pipe is inserted through such materials down to a desired depth and water or other fluid is forced through the same, the sand or other materials will be loosened by the agitating action of the moving fluid, and I have discovered that if a second pipe is introduced through the materials to the same or nearly the same depth a circulation can be obtained to a greater or less extent of the fluid introduced through the first pipe under pressure and passing through the sand or other loose material toward the second pipe, and so on up the second pipe, and in this manner an underground current can be produced that spreads horizontally through the sand to one or more exit-pipes, so that after the materials have been more or less agitated by the current of water or fluid passing from one pipe to the other cementing material in a sufficiently fluid condition can be passed through one pipe and will follow, generally, the looser material to the other pipe, and in this manner a layer of cement or of the cemented materials can be placed with more or less regularity at the desired depth; or by drawing the pipes successively in a vertical direction and successively repeating the operation a vertical or nearly-vertical slab of greater or less uniformity can be produced by the cementing material introduced through the mass of sand or other materials while they occupy their nearly natural or ordinary position, so that by consolidating or cementing the materials in such position as to inclose a mass whose removal is intended the excavations can be proceeded with and the water will be sufficiently shut off to prevent the wash of the sand or other material into the excavations, and in cases where it is desired to do so a foundation can be constructed in the quicksand or other material, commencing at a desired depth and forming slabs, blocks, piles, or monoliths of cement of more or less regularity and in the desired positions to form the proper supports for the superstructure.

In the construction of foundations and of sewers and in excavations for laying water-pipes, &c., it is often advantageous to make use of sheet-piling or coffer-dam work previous to excavating in the quicksand or similar material, and I place a floor of cemented material between the sheet-piling to prevent the water or quicksand from rising in the excavation from the bottom, which is usually one great source of difficulty.

Figure 6:
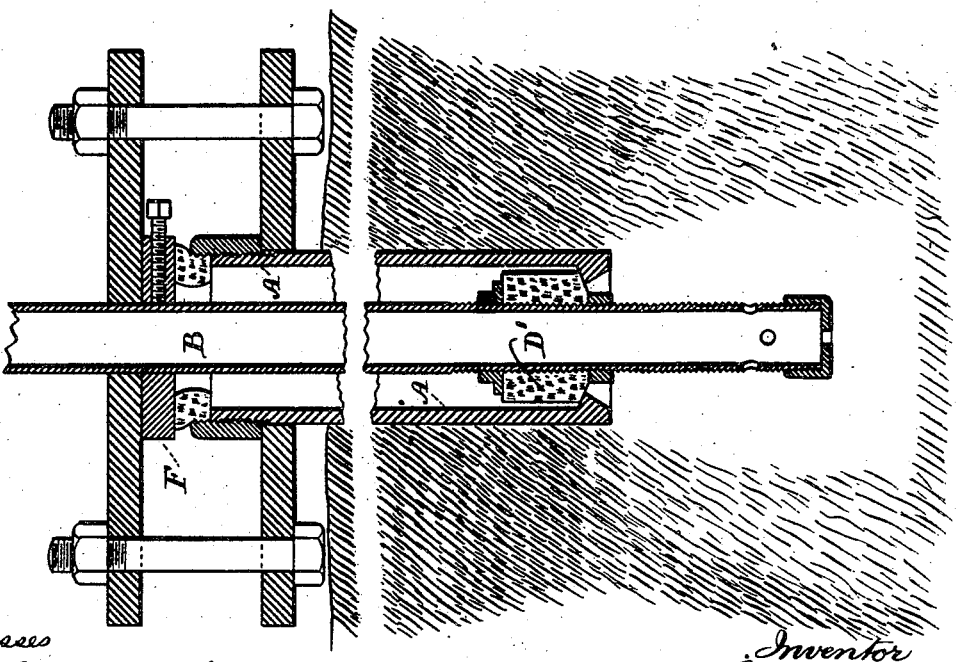
Figure 7:
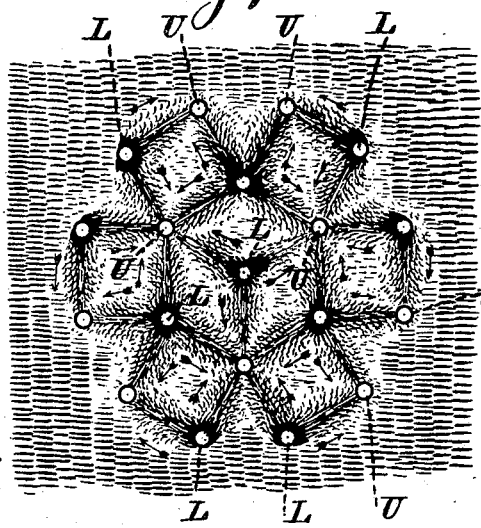
Figure 8:
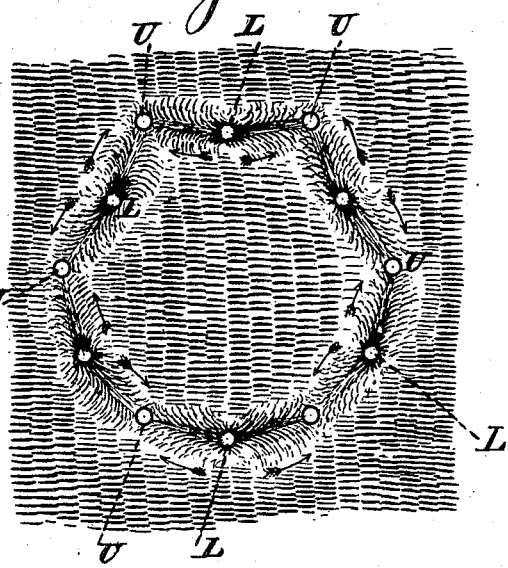
Figure 11:
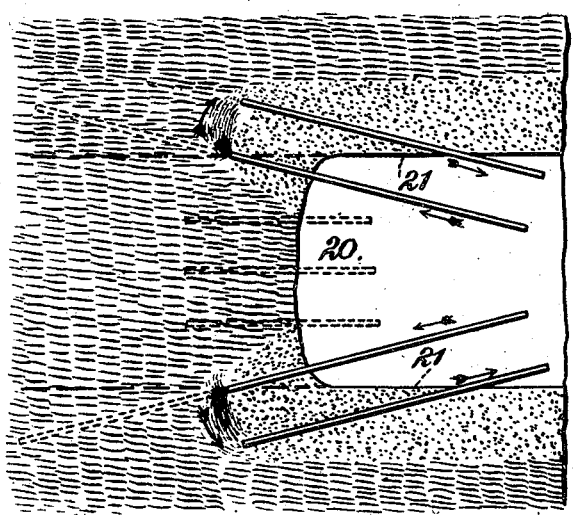
Figure 9:
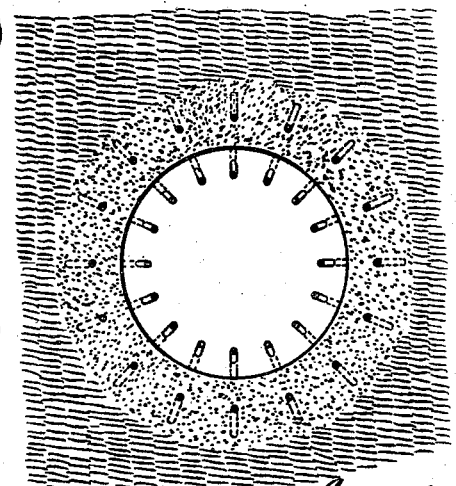
Figure 10:
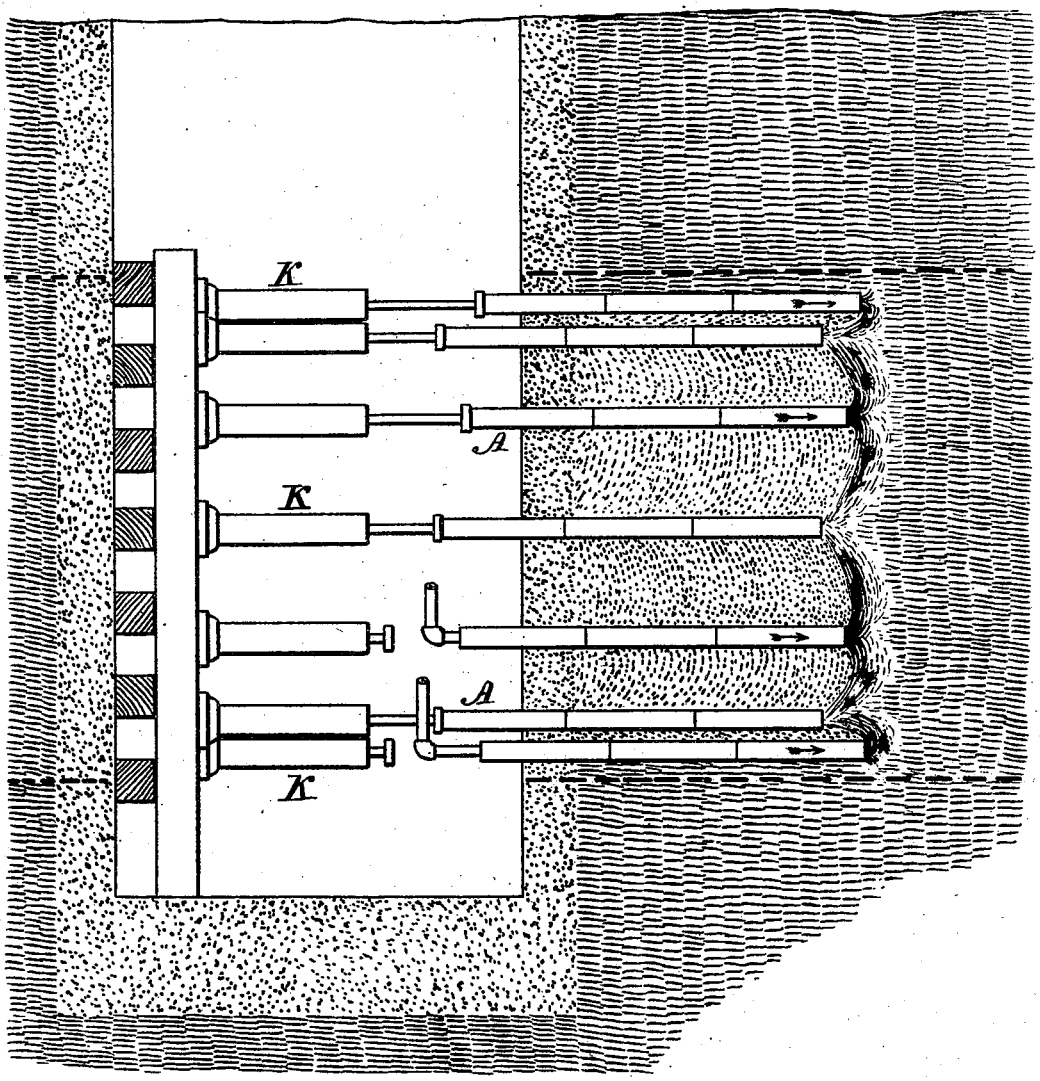

In the drawings, Figure 1 is a diagrammatic plan view illustrating the position in which pipes may be introduced for the aforesaid objects. Fig. 2 is a diagrammatic vertical section of similar pipes, both being shown in connection with sheet-piling; and Fig. 3 is a diagrammatic cross-section, and Fig. 4 a diagrammatic longitudinal section, representing the improvements as applied in connection with a floor and caisson or wall. Figs. 5 and 6 are sections, in larger size, of the pipes that may be employed. Figs. 7, 8, and 9 are diagrammatic cross-sections illustrating the positions in which the pipes and cement may be introduced in forming either a tunnel or a shaft, and Figs. 10 and 11 are longitudinal sections illustrative of some of the ways of using the present invention.

The pipes that I make use of may be of any suitable size, according to the character of the material in which the foundation is to be made and the positions of such pipes. I find it advantageous to make use of pipes two or three inches in diameter, of suitable length to extend to the desired place, and these pipes may have an open end and be driven or otherwise forced to place. It is convenient to introduce a second pipe $b$ within the larger pipe $a$, having a jet end, from which water is caused to issue to loosen the materials and allow the larger pipe to be driven or forced to its place. This manner of sinking pipes is well known. Two or more of these pipes are to be introduced into the material at the places where the cement is to be directed, and they may be either vertical or horizontal or at an inclination. I have represented them in Figs. 2, 3, and 4 as vertical. For illustration, let the pipe 2 represent the one through which water is forced and the pipe 3 be at a suitable distance from the pipe 2, so that when water or fluid is forced through the pipe 2 it may permeate the quicksand or other material and commence to rise in the pipe 3, and as the fluid will spread around the pipe 2 in all directions, and finally a portion of it will reach the pipe 3, the pressure in that direction is lessened and the flow will eventually be down the pipe 2 and, to a considerable extent, up the pipe 3, and in so doing the materials between the pipes 2 and 3 will be sufficiently agitated or loosened, so that when cementing material is forced down the pipe 2 it may spread mostly through the channel that the water or fluid had traveled until it reaches the pipe 3, which is then preferably stopped, and the material will spread or be forced into the adjacent materials. These pipes 2 and 3 may then be drawn up a suitable distance and the operations repeated, which is preferably after the first charge of cement has sufficiently set or hardened, and in this manner a slab of cement or cemented materials will be formed of any suitable thickness and with more or less regularity between the pipes 2 and 3. This operation may be promoted, if desired, by the introduction of the small water-pipe B through one of the larger pipes 2 or 3, having a lateral jet-opening or pipe for the issuing of the water, whereby the jet can be directed toward the pipe 3, if desired, and in so doing the force of the jet will aid in the establishing of the communication between the pipes 2 and 3.

It is advantageous to use the pipes illustrated in Figs. 5 or 6. In these A represents the exterior or larger pipe, and B the inner pipe, and it is preferable to have a valve D or D' near the lower end of the pipe B to close or open the bottom end of the pipe A. In Fig. 5 this valve D is conical at its upper end, and the lower end of the pipe A will be open when the valve D is kept below it and closed when such pipe B and valve are drawn up. In Fig. 6 the valve D' is smaller than the pipe A and closes downwardly upon the annular seat at the lower end of the pipe A.

In use, water may be passed down the pipe B and loosen the sand and wash it up through the pipe A, and this pipe A can be driven down from time to time. When a desired depth is reached, the valve can be closed, and the water or fluid under pressure will spread laterally until it reaches an adjacent pipe, as aforesaid. Sometimes an annular flap E may be connected to the pipe B or valve to spread by the upward pressure into a nearly horizontal position to lessen the flow up around the outside of the pipe A and to direct the fluid under pressure horizontally. This flap, being of flexible material, is folded together closely and downwardly around the pipe D and pushed through the pipe A after the latter has been put in place and some of the sand pumped out.

When suitable cement or cementing material—such as hydraulic cement or a proper quality of clay mixed with water—is to be introduced, the pipe B may first be withdrawn; but generally it is preferable to introduce such materials through this pipe B, and, to hold this pipe B in place and to aid in preventing the cementing material from rising in the pipe A under the pressure to which it is preferably subjected, a cap of suitable character may be applied to the top of the pipe A and around the pipe B, as at F, such cap being secured by screws or otherwise and rendered tight by packing.

In the construction of tiers or columns of cement in quicksand or other loose material the water may be forced down one of the pipes so as to spread in all directions, and in so doing loosen the quicksand or similar material, and this may be promoted by an alternate compression and suction of the water in such pipe or compression in one pipe and suction in another, and, if desired, the water may be pumped or forced out of such pipe to wash more or less of the sand or similar material toward the pipe at the bottom end, so that the same may be withdrawn with the water, thereby leaving a cavity in the quicksand or similar material near the lower end of the pipe, into which cementing material of a proper quality or mixed with sand to a greater or less extent may be introduced, and by the pressure caused to spread at the lower end of the pipe to whatever extent the force may send it, and by drawing this pipe upward successive additions to the cemented structure can be built up from the lowest to the highest levels, as desired. In the construction of horizontal or nearly-horizontal floors the same operations are to be performed.

Let it be presumed that pipes 4, 5, 6, and 7 are introduced to the desired depth, and water may be forced down the pipe 4 under sufficient pressure to reach one or more of the pipes 5, 6, 7, and 3, and, by a jet directed laterally from the lower end of the water-pipe, the materials may be loosened more or less in a horizontal direction, if desired, after which the cementing material introduced at the pipe 4 under proper pressure will spread laterally and reach one or more of the pipes 5, 6, 7, and 3, and either of the pipes can be closed by the valve at the lower end, or otherwise, if it becomes advantageous to do so in directing the circulation or flow of the water or of the cementing material to the desired places, and the floor may be still further spread by the washing action at one or more of the pipes 5 6 7 3, the water being directed horizontally to loosen up the materials and to wash the same out to a greater or less extent, either through the same pipe through which the water was first injected or through any one of the adjacent pipes. Hence by successive operations through pipes that are applied at proper distances apart the cementing material can be introduced horizontally or nearly so, to an indefinite extent, and will make a floor to shut off the inlet of water, quicksand, or other material before the excavations are made above the floor. This object may at times be still further promoted by sheet-piling at 8 and 9 or by coffer-dam or caisson work, and, if desired, the sheet-piling may form a square or inclosure, there being sheet-piling at 10 and 11 at the ends, and in this manner successive sections can be inclosed for the construction of a sewer or other work between the sheet-piling and above the cemented floor that is put down previous to the excavation, and this mode of procedure can be adopted in making foundations and in laying water-pipes, gas-pipes, or drains in streets or under buildings, especially through quicksand.

In cases where tunneling is being performed the water is preferably passed into an upper horizontal or inclined pipe, so that it will descend and pass back through a lower pipe, thereby establishing a channel between the distant ends of the pipes, in order that the cement may be introduced through one pipe, and in passing down toward the other pipe the materials will be cemented together and then the pipes can be driven in further and the operations repeated until a cement wall is constructed in the materials as they lie in substantially their natural positions; and a similar proceeding can be pursued in constructing a floor for a tunnel or in applying a cement in the materials above the place where the tunnel is to be excavated, thus aiding in keeping the materials in their proper position during the excavation for the tunnel or other structure.

The walls or inclosures in the sand or other materials may be formed, as before described, at any desired depth and extend to the required height, and such walls may be used alone or with the floor or horizontal layer before described, and such walls may extend above or below the floor, or both.

The improvement may also be used advantageously in the sinking of shafts through quicksands or other fine materials by solidifying, in the manner described, a shell or inclosure within which the shaft is to be sunk, or by so solidifying a mass sufficiently large to allow the excavation of the shaft through such mass. Tunnels may also be formed in the same manner.

Upon reference to Figs. 7, 8, and 9 it will be apparent that the pipes for water and for cement may form a circular range and be used as aforesaid. If the pipes are parallel, they may be forced along by hammers or hydraulic jacks K from time to time, as illustrated in the section Fig. 10, and additions made to their lengths, so as to introduce the cement ahead of or below the excavation. If other pipes are introduced, as shown by dotted lines 20, Fig. 11, the whole mass of material may be solidified and the central portion excavated to the line 21, if desired, to form a shaft or tunnel; but where the pipes are introduced at a greater or less inclination in tunnel-work, as seen in Figs. 9 and 11, the water is preferably directed through one set of pipes and passes along and returns through the other set of pipes in establishing the distant channels for introducing cement. In Figs. 7 and 8 the pipes L are shown as receiving the downtake and the pipes U the uptake in opening up the channels, and then the connections can be reversed, so that the pipes L become the uptake and the pipes U the downtake. The lines and arrows illustrate the directions in which the channels are opened up, and these channels may be more fully opened up by reversing the action, as aforesaid, and cement can be introduced through the tubes L until it reaches the tubes U, such tubes U either being open or having a suction applied to them, after which cementing materials can be also introduced into the pipes U and caused to spread toward the other tubes and intermingle with the previously-introduced cement.

It is to be understood that these improvements are especially available where the quicksand or other material has to be excavated; but where a structure is to be erected upon loose materials, this mode of procedure can be availed of in making an inclosure, columns, or monolith in the quicksand or other materials to properly support the superstructure, and in instances where a pier, building, or other structure is found to have an insecure foundation the foundation can be extended or enlarged into the quicksand, rubble, gravel, or other loose material to any desired area or depth by proceeding, as before set forth, until the desired columns, floors, inclosing walls, or monoliths are constructed in the loose materials without removing the pier, building, or other structure, in this way preventing the further settling or giving way of the foundation under the structure. The fluid that is introduced under pressure tends to spread at the bottom of the inlet-pipe and displace more or less earth or other material in the direction of the least resistance. If such fluid is injected too rapidly or under too much pressure, it will tend to lift the sand or earth and escape to the surface, there usually being the least resistance upwardly. If, however, the fluid is not injected too rapidly, the tendency of gravity is to cause such liquid to percolate downward, and the result of these two forces is to spread the fluid nearly horizontally. If now the fluid or that which it displaces reaches one of the other pipes, the pressure is relieved and a route of least resistance established toward that other pipe. Hence when the uptake of that other pipe is closed and the pressure increases in the injected fluid the tendency will be to spread farther in all directions and especially to rise toward the surface, which usually is the direction of least resistance. Hence by availing of these conditions the cementing material can be directed almost at will through the sand or similar material.

It will be evident that this invention has a wide range of application, and that in either shafts or tunnels or other works the pipes may be driven to the greatest distance for commencing the opening up of channels and the introduction of cement, and then the pipes may be partially drawn for each subsequent operation, or else the pipes may be thrust to the place where the cement is to be first applied, and then thrust or driven to a farther or more distant point for the next operation, and so on.

I claim as my invention—

1. The method herein specified of consolidating loose materials, consisting in introducing pipes at distances apart, passing water or fluid into one or more of the pipes to loosen the material around the ends of the pipes and establish currents between one pipe and the other, and then filling the interstices and channels with cementing materials introduced through one or more of the pipes, substantially as set forth.

2. The method herein specified of producing a floor or similar structure within the quicksand or other materials, consisting in introducing pipes at distances apart and to a desired level, loosening the materials between the lower ends of the respective pipes and near the desired floor-level by the action of a fluid forced into one or more of the pipes to establish a current from one pipe to another and introducing cementing material through such pipes, substantially as set forth.

3. The method herein specified of forming inclosures within sand or similar loose materials, consisting in passing water or other fluid through one or more pipes and through such materials to establish currents to the other pipes, and then introducing cementing material, then moving such pipes for their ends to be in different positions and repeating the operations by introducing water to open up channels, and afterward introducing cementing material, substantially as set forth.

4. The method herein specified of inclosing quicksand or similar material to be excavated, consisting in driving down sheet-piling and introducing cementing material into the sand or similar loose material through pipe passed down into the sand and between the piling to form a floor near the lower ends of the piles and previous to the excavation of such quicksand or loose material, thereby shutting off the inlet at the bottom, substantially as set forth.

5. The method herein specified of consolidating sand or similar material, consisting in forcing two or more pipes down in such material at a distance from one another, forcing a fluid through one of the pipes, and establishing an outward circulation to another pipe, and then forcing in a cementing material, and then repeating the operation in other pipes successively, substantially as set forth.

6. The method herein specified of establishing a circulation through sand or similar material, consisting in forcing three or more pipes down into such material at suitable distances from each other, forcing a fluid down one of the pipes, establishing an upward circulation in one of the other pipes, and then stopping off such upward circulation to cause the fluid under pressure to pass toward the uptake of the third pipe, substantially as set forth.

Signed by me this 22d day of May, 1891.

ROBERT L. HARRIS.

Witnesses:
 GEO. T. PINCKNEY,
 WILLIAM G. MOTT.